Figure 1:
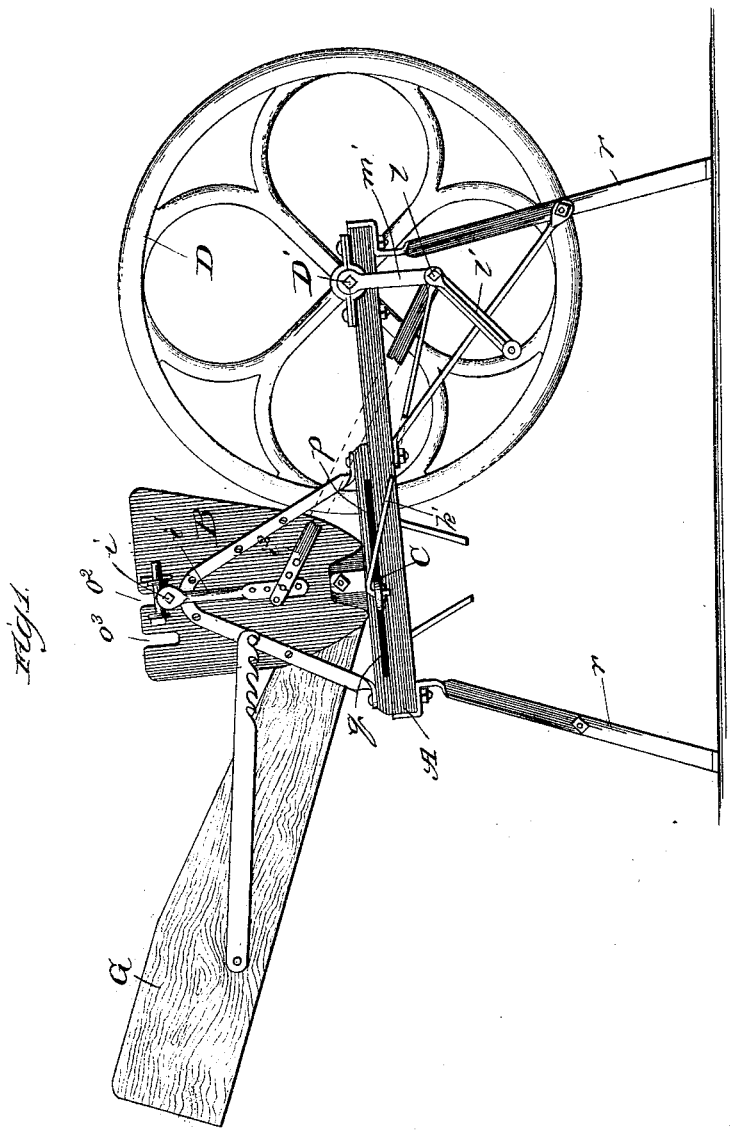

(No Model.) 3 Sheets—Sheet 1.

P. BOSTROM.
FEED CUTTER.

No. 415,405. Patented Nov. 19, 1889.

Witnesses:
Geo. Clayford.
J. H. Dyrenforth

Inventor:
Peter Bostrom
By Dyrenforth & Dyrenforth
Attys

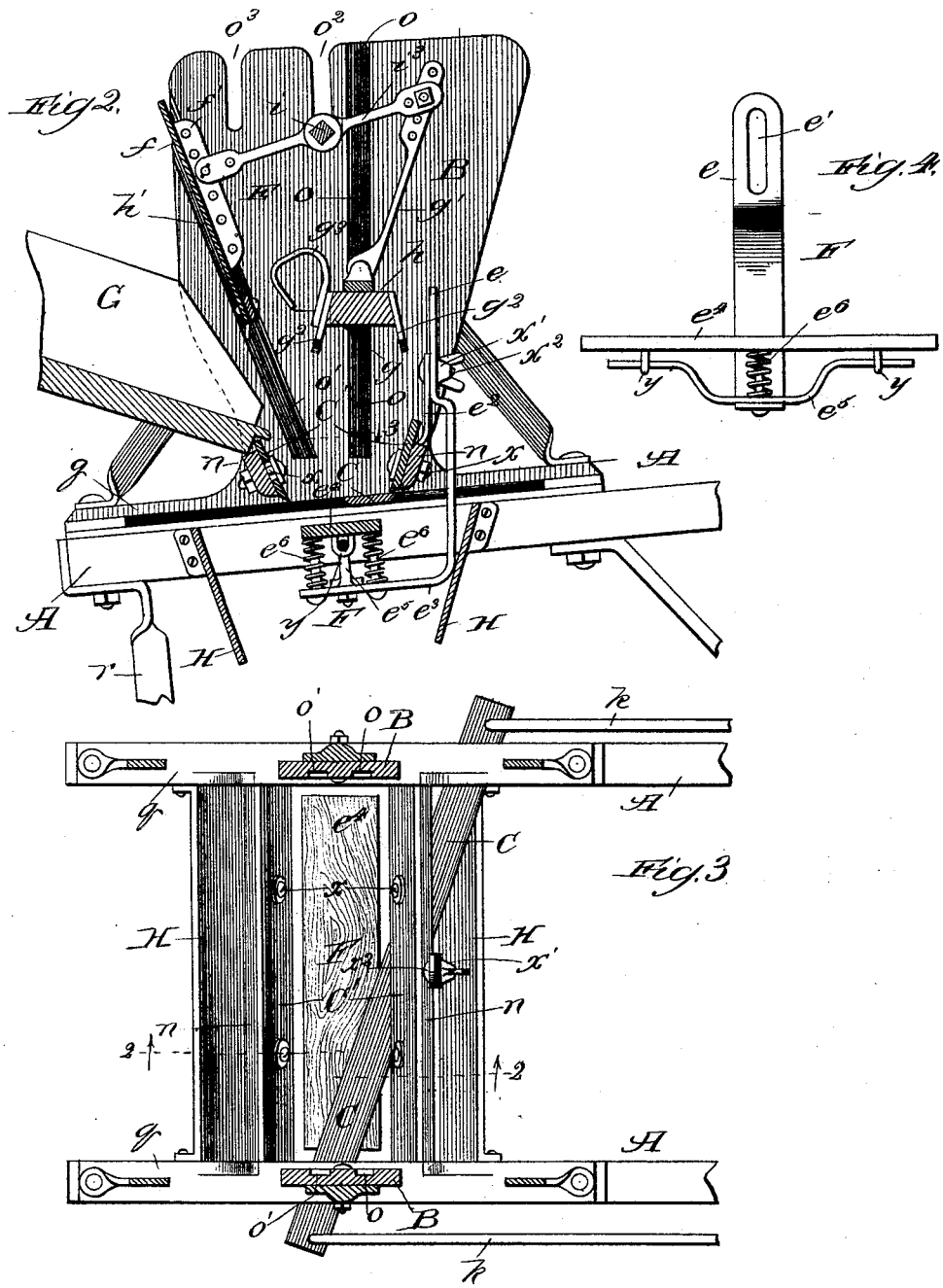

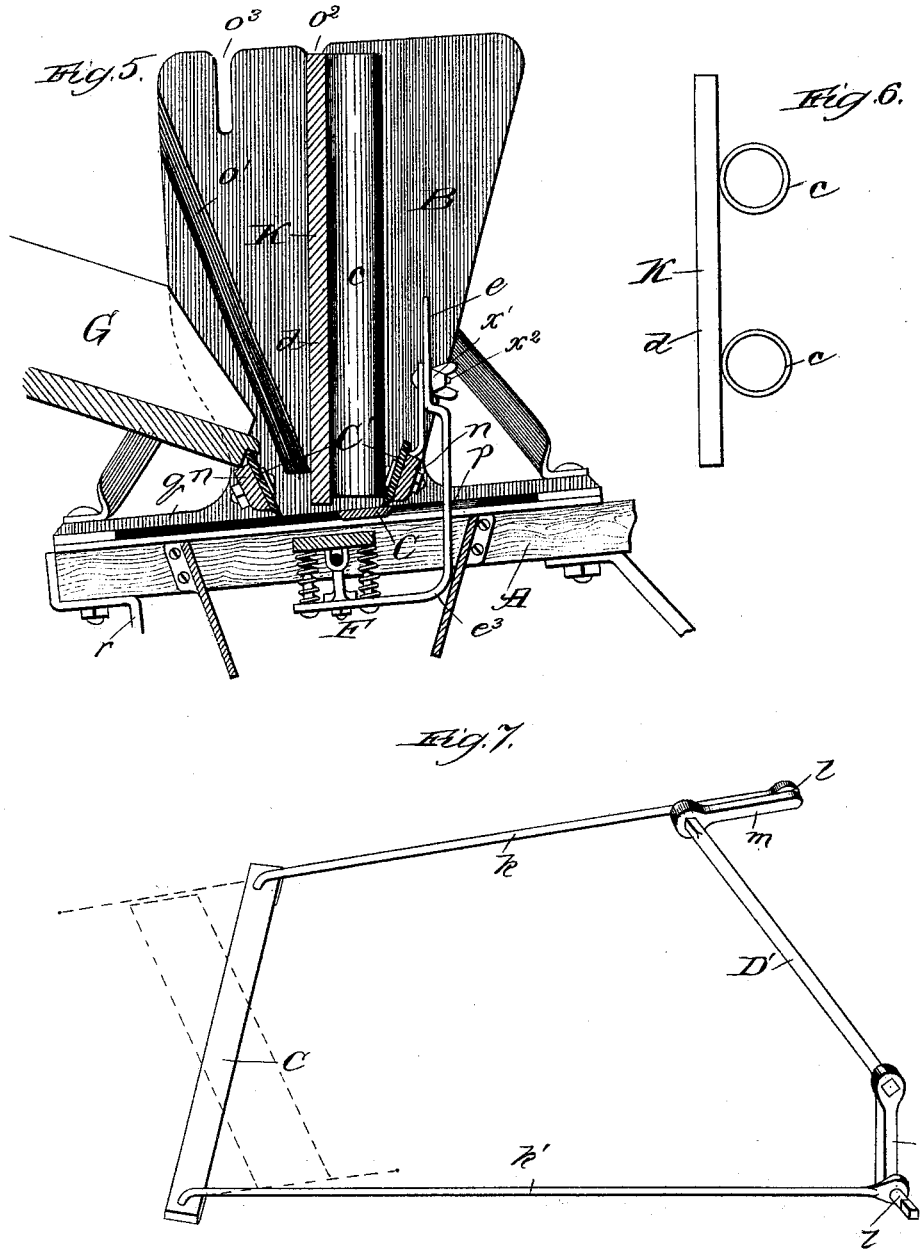

UNITED STATES PATENT OFFICE.

PETER BOSTROM, OF CHICAGO, ILLINOIS.

FEED-CUTTER.

SPECIFICATION forming part of Letters Patent No. 415,405, dated November 19, 1889.

Application filed June 18, 1889. Serial No. 314,689. (No model.)

*To all whom it may concern:*

Be it known that I, PETER BOSTROM, a citizen of the United States, residing at Chicago, in the county of Cook and State of Illinois, have invented a new and useful Improvement in Feed-Cutters, of which the following is a specification.

My invention relates to improvements in the class of machines employed for preparing feed for animals by cutting it.

The objects of my improvement are to provide a feed-cutter which will serve equally well to cut hay and straw and cornstalks and ears of corn, even with the husks on the latter, and to provide a feed-cutter of generally novel and improved construction.

In the accompanying drawings, Figure 1 is a view in side elevation, partly broken, of my improved machine; Fig. 2, a broken longitudinal section thereof, taken on the line 2 2 of Fig. 3 and viewed in the direction of the arrows; Fig. 3, a plan section taken at the line 3 of Fig. 2 and viewed in the direction of the arrow; Fig. 4, a view in front elevation of the gage detail for controlling the length cut from the feed; Fig. 5, a broken longitudinal sectional view of the machine, like the view illustrated in Fig. 2, but having the feed-compacting attachment therein shown removed and replaced by the attachment for feeding ears of corn to the machine, and which is represented in Fig. 6 in a plan view; and Fig. 7 is a perspective diagram showing the knife and its connection with the actuating mechanism.

A is the frame, supported by legs $r$, and which may incline slightly, as shown, toward the feed or rear end of the machine. Each side bar of the frame is surmounted by a guide-plate $q$, extending from the feeding end along part of the length of the side bar, and affording between the latter and the guide-plate a slot $p$.

B B are sides or wings on opposite sides of the machine, extending upward from the side bars of the frame from near the longitudinal center of the slots $p$, and each having on its inner side and near its vertical center a perpendicular slot $o$ and a slot $o'$, inclining downward toward the slot $o$ from the lateral edge of each side B nearest the rear end of the machine, (so designated herein in contradistinction to the forward end, or end from which the machine is actuated, as hereinafter described;) and recesses $o^2$ and $o^3$ are provided to afford bearings in the upper edges of the sides B between the slots $o$ and slots $o'$. The slots and recesses in the opposite sides B are respectively coincident with each other.

On opposite sides of the transverse center of the guide-slots $p$, and supported on the frame A, to extend across it near the bases of the sides B, I provide stationary plates affording knives C', inclining downward toward each other, with their lower edges beveled, as shown, and the stationary knives being adjustably supported on head-blocks $n$, their adjustment being effected, on loosening and tightening the bolts $x$, to compensate for wear of the beveled edges by lowering them to cause them to extend flush with the upper surfaces of the guide-slots $p$, in which the cutting-instrument C, hereinafter described, is actuated.

D is a wheel, preferably in the form of a balance-wheel, supported near the forward end of the machine, between the side bars, on a rotary shaft D', Fig. 7, journaled in the frame, and provided on opposite ends with crank-arms $m$ and $m'$, set at different and preferably at right angles to each other, and each having a stud $l$, extending parallel with the shaft D' from near its free end, that on the arm $m'$ affording a stem on which to connect a crank-handle $l'$, Fig. 1.

The cutter or knife C comprises a flat steel bar having cutting-edges formed along its opposite lateral sides, and supported to extend through the guide-slots $p$ at its opposite ends, from which, respectively, it is connected by pitman-rods $k$ and $k'$ with the crank-arms $m$ and $m'$ at the studs $l$.

E, Fig. 2, is a compacting attachment for use with the machine in the cutting of hay or straw, and comprising a rock-shaft $i$, journaled in the coincident slots $o^2$, and having a crank-arm $i'$ on one end, connected with a stud $l$ on one of the crank-arms of the balance-wheel by a link $i^2$, a beam $i^3$, supported centrally on the rock-shaft $i$, to extend across the latter, and having compacters $h$ and $h'$ pivotally and adjustably connected with its opposite ends. The compacter $h$ is formed of a head $g$, fitting at opposite ends in the vertical slots $o$, and connected by an adjustable link $g'$ with one end of the beam $i^3$, and plates $g^2$, secured to the downward and outwardly-beveled sides of the head $g$ and serrated along their lower edges. A shield $g^3$ may be provided on the rear side of the head, of suitable form to prevent the reciprocating action, hereinafter described, of the compacters from carrying the hay or straw being cut upward. The compacter $h'$ involves a plate $f$, fitting at opposite edges between the inclined slots $o'$, and having a head $f'$, at which to connect it adjustably to the opposite end of the rocking beam $i^3$, and the lower edge of the plate is serrated like the plates $g^2$.

F is a spring-gage, comprising a bent arm $e$, removably and adjustably secured by a nut $x'$ on a bolt $x^2$, passed through its slot $e'$ on a support $e^2$, and carrying on its horizontal portion $e^3$, which extends below the stationary knives $C'$, a spring-board $e^4$, supported yieldingly on the horizontal part $e^3$ of the bent arm $e$ through the medium of a yoke $e^5$, extending at its opposite ends through staples $y$ on the under side of the board and springs $e^6$ on opposite sides of the yoke.

G is the inclined chute through which to feed the material (hay or straw) to be cut to the machine, and it leads, as shown in Fig. 2, between the stationary knives, and should be supported in some such manner as that shown in Fig. 1 to permit it to be removed when not used, or adjusted into a vertical position, if desired, for use therein, when it could be supported between the sides B.

The operation is as follows: The hay or straw to be cut is introduced into the chute with the ends extending into the path of movement of the compacter $h'$, the spring-board $e^4$ being adjusted to a distance below the knife C according to the length to be cut from the material. The wheel D is then rotated, (by hand or other power,) thereby reciprocating the knife C in the guide-slots $p$, and, owing to the connection thereof with the cranks $m$ and $m'$, producing in the back-and-forth movement of the knife an oscillation from end to end in the plane of its reciprocation, thereby causing it to exert in each direction of reciprocating movement a shearing action against the stationary knives $C'$ upon the material. This combination of movements of the knife is very powerful and positive and produces a clean cut in each direction, the machine serving to sever paper even as cleanly as feed. While the knife is being actuated in the manner described, the eccentric connection of the compacting attachment E with the balance-wheel produces rocking of the shaft $i$ and beam $i^3$ and consequently of the compacters $h'$ and $h$ alternately up and down in their guides, the first-named serving to compact the hay or straw against the gage F and the last-named to crowd it out of the machine through a hopper-shaped attachment H, extending below the frame A. The stroke of the knife C is so powerful that it adapts the machine to cut equally as well and readily such feed as cane, cornstalks, and ears of corn, though for none of these purposes is the chute G required in its inclined position; but for cutting cane and cornstalks it is advisable to feed the material vertically to the cutting mechanism, which I practice by adjusting the chute to a perpendicular position to serve as a guide, and which its adjustable construction readily permits, the compacting attachment E being then (and also in the use of the machine to cut corn-ears and the like) removed, which, as will be readily apparent from the drawings, may be easily accomplished on disconnecting from it the link $i^2$.

For the purpose of adapting the machine the more readily to the cutting of ears of corn, I prefer to provide the attachment K, (shown in Figs. 5 and 6,) comprising a base $d$ to be inserted at its lateral edges into the coincident slots $o$, between which it fits snugly, and having on one side one or more spouts $c$, extending perpendicularly with reference to the plane of the cutter C, and of sufficient diameter to admit one at a time the ears to be cut and guide them to the cutting mechanism.

The more important and more valuable (as I consider them) features of my improvement are due to the manner of operation of the cutting mechanism, and to the general construction of the machine involving it; hence I do not wish to be understood as limiting my invention to the means shown and described for actuating the cutting mechanism, nor to the exact details of construction of my machine, as they may be changed by those skilled in the art to which my improvement relates without thereby departing from the spirit of my invention.

What I claim as new, and desire to secure by Letters Patent, is—

1. In a feed-cutter, the combination, with the frame, of a double-edged knife C, supported and guided in the frame, and means, substantially as described, operating to reciprocate the knife bodily through the path of feed of the material to be cut and oscillate it from each end to the other alternately in opposite directions in its reciprocating movement to produce a shearing cut, substantially as set forth.

2. In a feed-cutter, the combination of a frame A, having guide-slots $p$, a double-edged knife C, supported in the guide-slots, and a rotary shaft $D'$, journaled in the frame and provided at opposite ends with crank-arms $m$ and $m'$, set at different angles, and connected with opposite ends of the knife by pitman-rods $k$ and $k'$, substantially as and for the purpose set forth.

3. In a feed-cutter, the combination, with the frame, of a double-edged knife C, supported and guided in the frame, means, substantially as described, operating to reciprocate the knife in the path of feed of the material to be cut and oscillate it in the plane of its reciprocation to produce a shearing cut, and a spring-gage F, supported to extend below the said knife, substantially as set forth.

4. In a feed-cutter, the combination, with the frame, of a double-edged knife C, supported and guided in the frame, means, substantially as described, operating to reciprocate the knife bodily through the path of feed of the material to be cut and oscillate it from each end to the other alternately in opposite directions in its reciprocating movement to produce a shearing cut, and stationary knives C', supported above the knife C, substantially as set forth.

5. In a feed-cutter, the combination, with the frame, of a double-edged knife C, supported and guided in the frame, means, substantially as described, operating to reciprocate the knife in the path of feed of the material to be cut and oscillate it in the plane of its reciprocation to produce a shearing cut, a spring-gage F, adjustably supported to extend below the said knife, and stationary adjustable knives C', supported above the knife C, substantially as set forth.

6. In a feed-cutter, the combination, with the frame, of a double-edged knife C, supported and guided in the frame, means, substantially as described, operating to reciprocate the knife bodily through the path of feed of the material to be cut and oscillate it from each end to the other alternately in opposite directions in its reciprocating movement to produce a shearing cut, sides B, and a compacter E, supported in the said sides and connected with and actuated from the knife-operating mechanism, substantially as set forth.

7. In a feed-cutter, the combination, with the frame, of a double-edged knife C, supported and guided in the frame, means, substantially as described, operating to reciprocate the knife in the path of feed of the material to be cut and oscillate it in the plane of its reciprocation to produce a shearing cut, a gage F, supported to extend below the said knife, stationary knives C', supported above the knife C, sides B on the frame, having slots $o$ and $o'$, and a compacting attachment E, comprising a rock-shaft $i$, supported on the sides and connected with and actuated from the knife-operating mechanism and carrying a beam $i^3$, having compacters $h$ and $h'$, connected with its opposite ends and confined and movable, respectively, in the slots $o$ and $o'$, substantially as set forth.

8. In a feed-cutter, the combination, with the frame, of a double-edged knife C, supported and guided in the frame, means, substantially as described, operating to reciprocate the knife in the path of feed of the material to be cut and oscillate it in the plane of its reciprocation to produce a shearing cut, a gage F, supported to extend below the said knife, stationary knives C', supported above the knife C, sides B on the frame having slots $o$ and $o'$, and a compacting attachment E, comprising a rock-shaft $i$, supported in the sides and connected with and actuated from the knife-operating mechanism and carrying a beam $i^3$, a compacter $h$, having a head $g$ in the slots $o$ and provided with serrated plates $g^2$ and a shield $g^3$ and linked to one end of the beam, and a compacter $h'$ in the slots $o'$, and connected with the opposite end of the beam and serrated at its lower end, substantially as described.

9. In a feed-cutter, the combination of a frame A, having guide-slots $p$, a double-edged knife C, supported in the said guide-slots, sides B, having guide-slots $o$ and $o'$, a wheel D on a rotary shaft D', journaled in the frame and provided with crank-arms $m$ and $m'$, set at different angles and connected with opposite ends of the knife by pitman-rods $k$ and $k'$, and a compacting attachment E, comprising a rock-shaft $i$, journaled in the sides B and linked to a crank-arm of the shaft D', a beam $i^3$, and compacters $h$ and $h'$, movable in the guide-slots $o$ and $o'$, and connected, respectively, with the beam toward its opposite ends, substantially as described.

PETER BOSTROM.

In presence of—
J. W. DYRENFORTH,
M. J. BOWERS.